United States Patent
Song et al.

(10) Patent No.: US 10,747,182 B2
(45) Date of Patent: Aug. 18, 2020

(54) WATCH-TYPE MOBILE TERMINAL AND OPERATION METHOD THEREOF

(71) Applicant: LG ELECTRONICS INC., Seoul (KR)

(72) Inventors: Younghoon Song, Seoul (KR); Jumin Chi, Seoul (KR); Yung Kim, Seoul (KR); Sooyoung Her, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 15/577,291

(22) PCT Filed: Jun. 24, 2015

(86) PCT No.: PCT/KR2015/006438
§ 371 (c)(1),
(2) Date: Nov. 27, 2017

(87) PCT Pub. No.: WO2016/190478
PCT Pub. Date: Dec. 1, 2016

(65) Prior Publication Data
US 2018/0157217 A1   Jun. 7, 2018

(30) Foreign Application Priority Data
May 27, 2015 (KR) ........................ 10-2015-0074062

(51) Int. Cl.
*G04G 21/00*   (2010.01)
*G06F 3/0488*   (2013.01)
(Continued)

(52) U.S. Cl.
CPC ........... *G04G 21/00* (2013.01); *G04B 19/223* (2013.01); *G04C 3/001* (2013.01); *G04G 21/06* (2013.01);
(Continued)

(58) Field of Classification Search
CPC .............................. G04G 21/00; G04B 19/223
See application file for complete search history.

(56) References Cited

U.S. PATENT DOCUMENTS

2006/0114753 A1   6/2006   Gerber
2006/0139320 A1   6/2006   Lang
(Continued)

FOREIGN PATENT DOCUMENTS

| KR | 10-2011-0113368 | 10/2011 | |
|---|---|---|---|
| KR | 10-2015-0025206 | 3/2015 | |
| WO | WO-9325942 A1 * | 12/1993 | ......... G04B 45/0092 |

OTHER PUBLICATIONS

PCT International Application No. PCT/KR2015/006438, International Search Report dated Feb. 26, 2016, 2 pages.

*Primary Examiner* — Edwin A. Leon
*Assistant Examiner* — Jason M Collins
(74) *Attorney, Agent, or Firm* — Lee, Hong, Degerman, Kang & Waimey

(57) ABSTRACT

An operation method of a watch-type mobile terminal including a display unit according to an embodiment of the present invention comprises the steps of: recognizing a type of a bezel which is detachable from the display unit; receiving an input of at least one hard key included in the bezel; and performing a function corresponding to the type of the bezel on the basis of the received input.

9 Claims, 15 Drawing Sheets

(51) Int. Cl.

| | |
|---|---|
| *G06F 1/16* | (2006.01) |
| *G04G 21/06* | (2010.01) |
| *G06F 3/0482* | (2013.01) |
| *G04C 3/00* | (2006.01) |
| *G06F 3/0489* | (2013.01) |
| *G04B 19/22* | (2006.01) |
| *G06F 3/02* | (2006.01) |
| *G06F 3/023* | (2006.01) |
| *G06F 3/0487* | (2013.01) |

(52) U.S. Cl.
CPC ............ *G06F 1/163* (2013.01); *G06F 1/1643* (2013.01); *G06F 1/1684* (2013.01); *G06F 3/0202* (2013.01); *G06F 3/023* (2013.01); *G06F 3/0482* (2013.01); *G06F 3/0487* (2013.01); *G06F 3/0488* (2013.01); *G06F 3/0489* (2013.01)

(56) References Cited

U.S. PATENT DOCUMENTS

2007/0247976 A1   10/2007  Capozzi et al.
2015/0365119 A1*  12/2015  Shin .................... H04M 1/0233
                                                                        455/575.1

* cited by examiner (a)　　　　　　　　　　(b)

(a)　　　　　　　　　　(b)

(a)　　　　　　　　　　(b)

(a)  (b)

(a)  (b)

(a)            (b)

Long Press(8sec)
: Power On/Off
Short Press
: Home / Menu
Long Press(2sec)
: Settings (a)   (b)

FIG.16
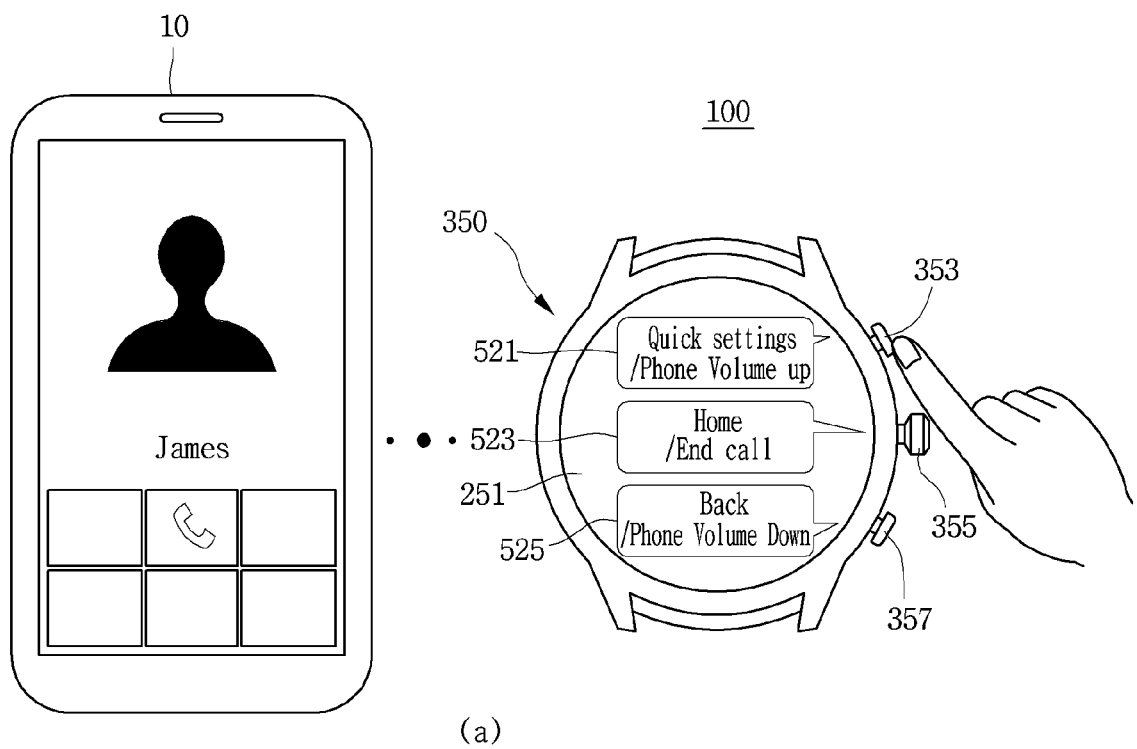
(a)
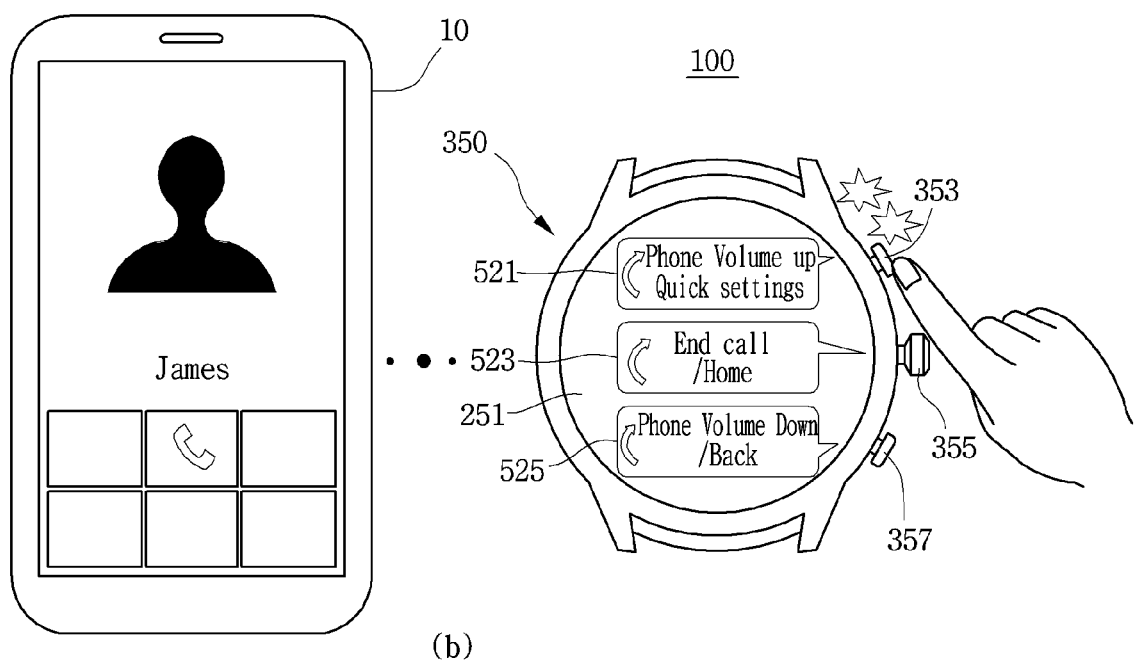
(b)

FIG.17
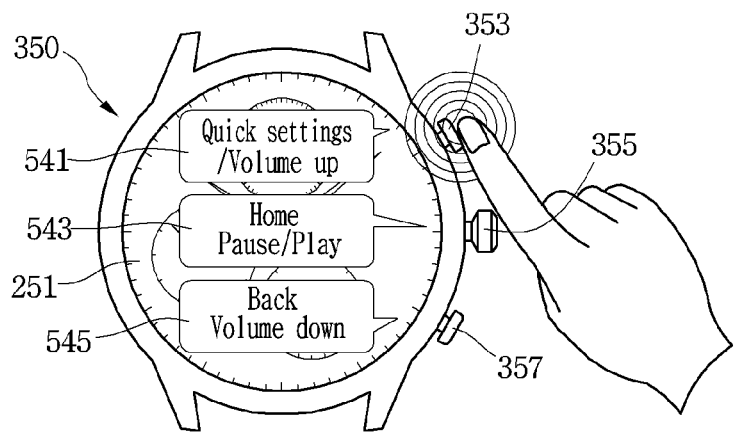
(a)
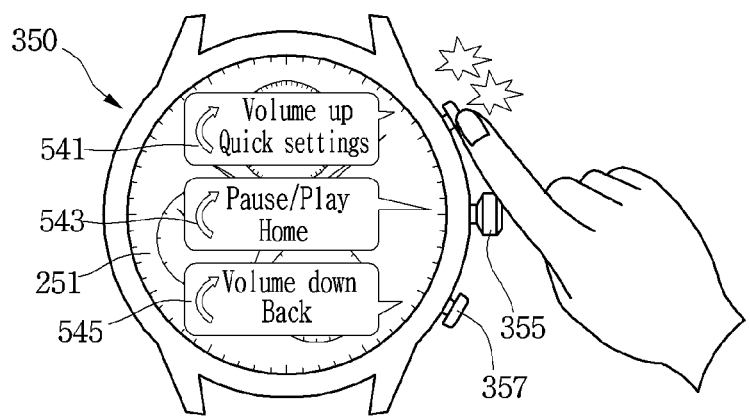
(b)

FIG.18
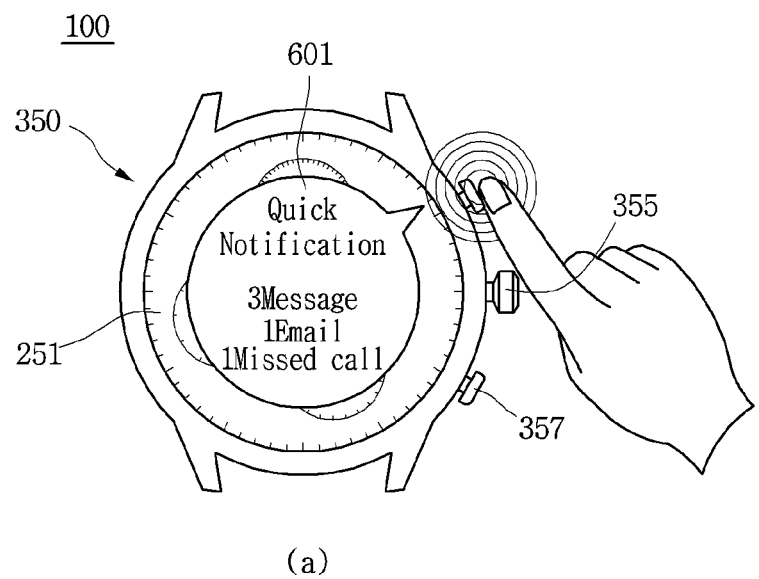
(a)
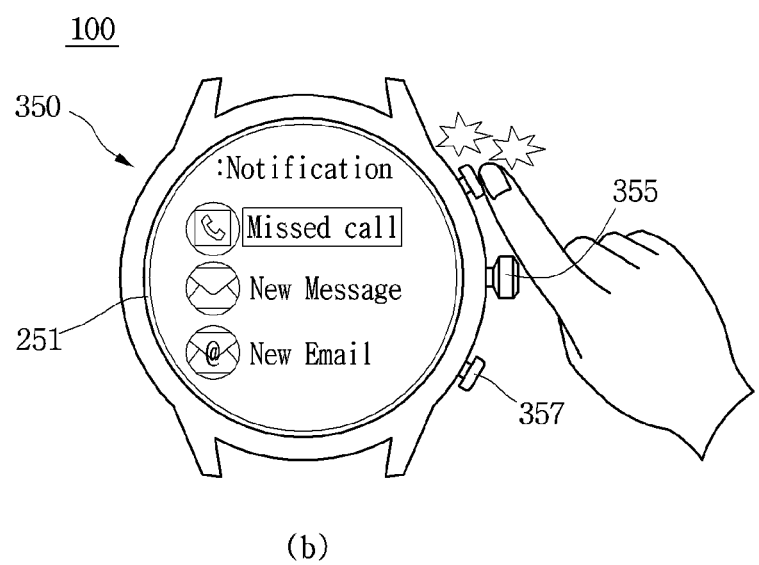
(b)

FIG.19
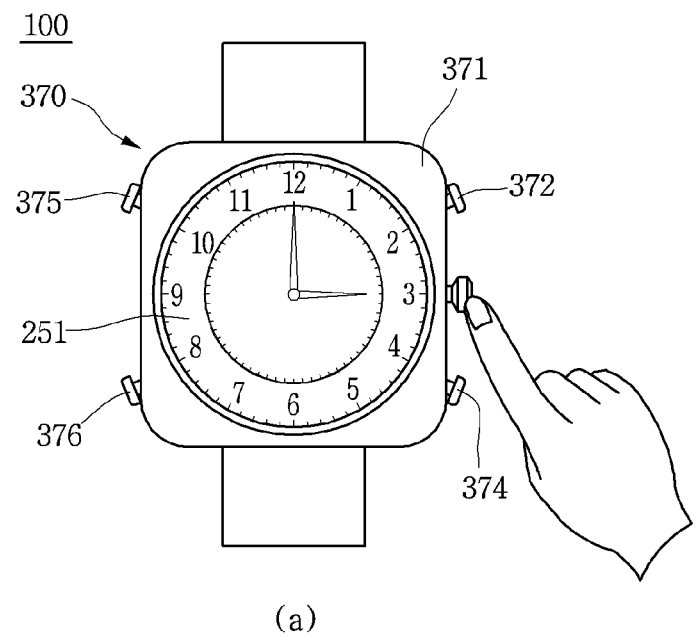
(a)
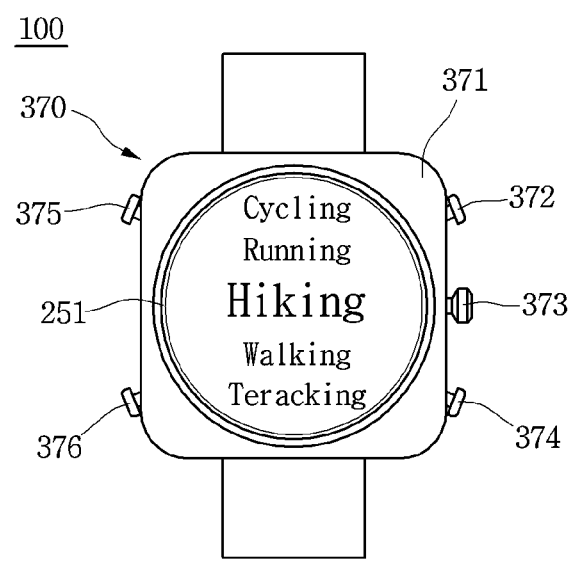
(b)

WATCH-TYPE MOBILE TERMINAL AND OPERATION METHOD THEREOF

CROSS-REFERENCE TO RELATED APPLICATIONS

This application is the National Stage filing under 35 U.S.C. 371 of International Application No. PCT/KR2015/006438, filed on Jun. 24, 2015, which claims the benefit of earlier filing date and right of priority to Korean Application No. 10-2015-0074062, filed on May 27, 2015, the contents of which are all hereby incorporated by reference herein in their entirety.

TECHNICAL FIELD

The present invention relates to a watch-type mobile terminal, capable of realizing the use of a terminal by more taking into consideration the convenience of the user.

BACKGROUND ART

Terminals may be generally classified as mobile/portable terminals or stationary terminals according to their mobility. Mobile terminals may also be classified as handheld terminals or vehicle mounted terminals according to whether or not a user may directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Users mostly hold and use the mobile terminals by their hands and furthermore, the mobile terminals may be expanded to wearable devices which may be worn on their bodies. The wearable devices include a watch-type mobile terminal, a glass-type mobile terminal, a head mounted display (HMD), and so on.

Among others, the watch-type mobile terminal is formed by the adding of electronic, communication and multimedia functions to a watch which a human being always wear, and it seems that a big market is formed in the future because the watch-type mobile terminal does not provide antipathy to the human being.

Thus, research, development and commercialization of the watch-type mobile terminal are being actively conducted.

The watch-type mobile terminal includes a bezel including a user input unit, which is so called "crown key". However, a conventional watch-type mobile terminal has a difficulty in replacing a bezel coupled to a display unit with new one. In addition, the number of hard keys included in the bezel is fixed so that only fixed functions are performed.

DISCLOSURE

Technical Problem

An object of the present invention is to provide a watch-type mobile terminal capable of providing various functions through a replaceable bezel.

Another object of the present invention is to provide a watch-type mobile terminal capable of providing optimized functions depending on the types of bezels attached to a display unit.

Technical Solution

According to one embodiment of the present invention, an operating method of a watch-type mobile terminal including a display unit includes recognizing a type of a bezel detachable from the display unit, receiving an input to at least one hard key included in the bezel, and performing a function corresponding to the type of the bezel based on the received input.

According to an embodiment of the present invention, a watch-type mobile terminal includes a display unit, a bezel detachable from the display unit, and a control unit to recognize a type of the bezel as the bezel is attached to the display unit, to receive an input to at least one hard key included in the bezel, and to perform a function corresponding to the type of the bezel based on the received input.

Advantageous Effects

According to various embodiments of the present invention, the user may easily replace the bezel with new one and may experience various functions through replaceable bezels In addition, according to various embodiments of the present invention, the optimized functions may be provided depending on the types of the bezel attached to the display unit.

DESCRIPTION OF DRAWINGS

FIGS. 14 to 18 are views illustrating functions executable in response to the input of pressing the hard key included in the third-type bezel according to various embodiments of the present invention.

FIG. 19 is a view illustrating a function executable in response to an input of pressing the hard keys included in the fourth-type bezel according to an embodiment of the present invention.

BEST MODE

Mode for Invention

Figure 1:
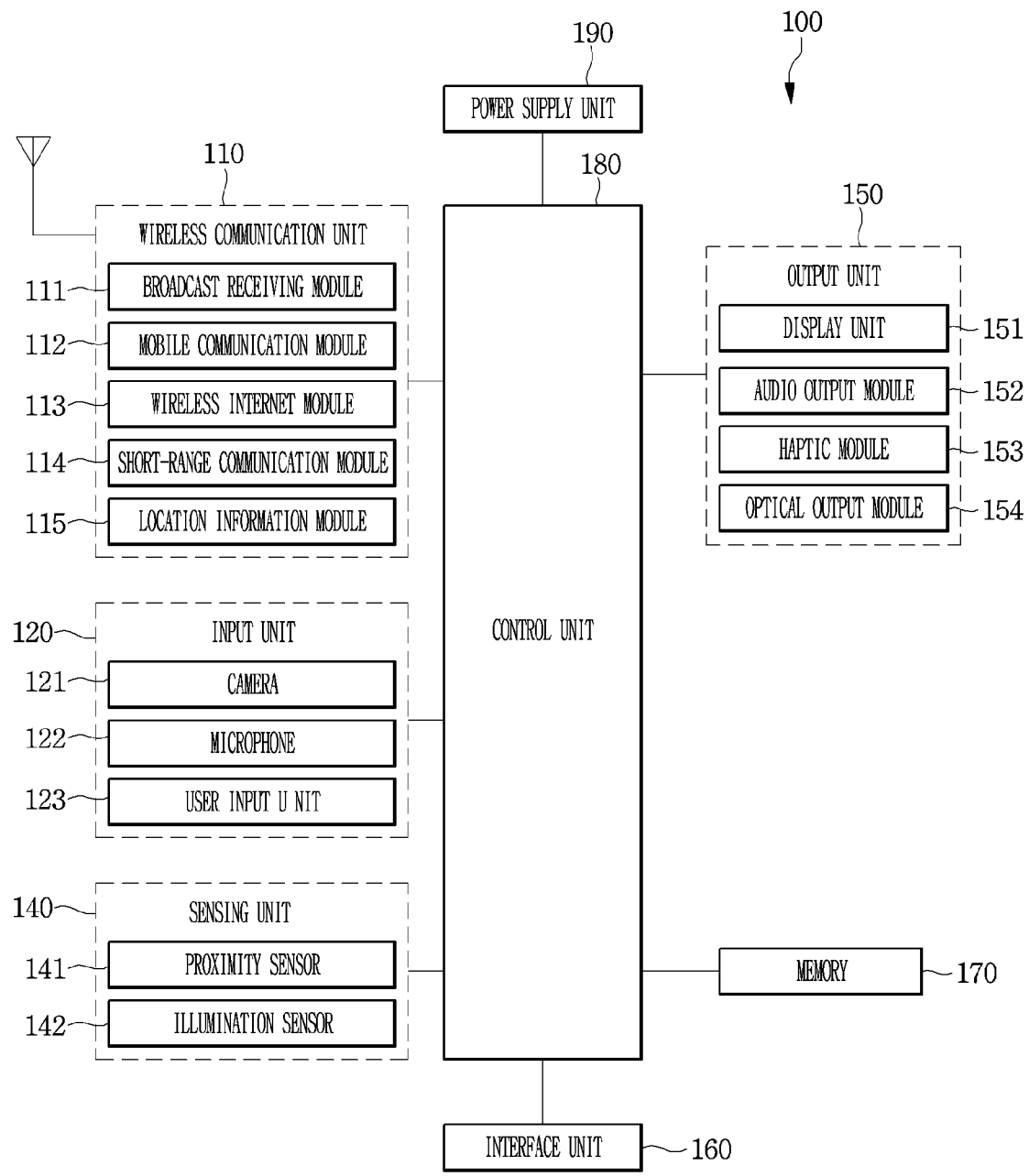
FIG. 1 is a block diagram illustrating a mobile terminal related to the present invention.

Hereinafter, embodiments are described in more detail with reference to accompanying drawings and regardless of the drawings symbols, same or similar components are assigned with the same reference numerals and thus repetitive for those are omitted. Since the suffixes "module" and "unit" for components used in the following description are given and interchanged for easiness in making the present disclosure, they do not have distinct meanings or functions. In the following description, detailed descriptions of well-known functions or constructions will be omitted because they would obscure the present invention in unnecessary detail. Also, the accompanying drawings are used to help easily understanding embodiments disclosed herein but the technical idea of the present invention is not limited thereto. It should be understood that all of variations, equivalents or substitutes contained in the concept and technical scope of the present invention are also included.

FIG. 1 is a block diagram for explaining a mobile terminal related to an embodiment.

A watch-type mobile terminal 100 may include a wireless communication unit 110, an input unit 120, a sensing unit 140, an output unit 150, an interface unit 160, a memory 170, a control unit 180, and a power supply unit 190. In implementing the watch-type mobile terminal, components shown in FIG. 1 are not necessary, so the watch-type mobile terminal described in this specification may include more or less components than those listed above.

In more detail, the wireless communication unit 110 typically includes one or more modules which permit communications such as wireless communications between the watch-type mobile terminal 100 and a wireless communication system, communications between the watch-type mobile terminal 100 and another mobile terminal, communications between the watch-type mobile terminal 100 and an external server. Further, the wireless communication unit 110 typically includes one or more modules which connect the watch-type mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 may include one or more sensors to sense at least one of internal information of the watch-type mobile terminal, surrounding environment information of the watch-type mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The watch-type mobile terminal 100 may be configured to utilize the combination of information sensed of at least two of the sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the watch-type mobile terminal 100 and a user, as well as function as the user input unit 123 which provides an input interface between the watch-type mobile terminal 100 and the user.

The interface unit 160 serves as an interface with various types of external devices that may be coupled to the watch-type mobile terminal 100. The interface unit 160, for example, may include any of wired or wireless ports, external charging ports, wired or wireless data ports, memory card ports, ports for connecting a device having an identification module, audio input/output (I/O) ports, video I/O ports, earphone ports, and the like. In some cases, the watch-type mobile terminal 100 may perform assorted control functions associated with a connected external device, in response to the external device being connected to the interface unit 160.

The memory 170 is typically implemented to store data to support various functions or features of the watch-type mobile terminal 100. For instance, the memory 170 may be configured to store application programs executed in the watch-type mobile terminal 100, data or instructions for operations of the watch-type mobile terminal 100, and the like. Some of these application programs may be downloaded from an external server via wireless communication. Other application programs may be installed within the watch-type mobile terminal 100 at time of manufacturing or shipping, which is typically the case for basic functions of the watch-type mobile terminal 100 (for example, receiving a call, placing a call, receiving a message, sending a message, and the like). It is common for application programs to be stored in the memory 170, installed in the watch-type mobile terminal 100, and executed by the control unit 180 to perform an operation (or function) for the watch-type mobile terminal 100.

The control unit 180 typically functions to control overall operation of the watch-type mobile terminal 100, in addition to the operations associated with the application programs. The control unit 180 may provide or process information or functions appropriate for a user by processing signals, data, information and the like, which are input or output by the various components as described above, or activating application programs stored in the memory 170.

The control unit 180 may provide or process information or functions appropriate for a user by processing signals, data, information and the like, which are input or output by the various components depicted in FIG. 1, or activating application programs stored in the memory 170. Further, the control unit 180 operates at least two of components included in the watch-type mobile terminal 100 by combining the at least two of components.

The power supply unit 190 may be configured to receive external power or provide internal power in order to supply appropriate power required for operating elements and components included in the watch-type mobile terminal 100, under the control of the control unit 180. The power supply unit 190 may include a battery, and the battery may be configured to be embedded in the terminal body, or configured to be detachable from the terminal body.

At least some of the components may operate in cooperation with each other to realize the operation, the control, or the control method of a watch-type mobile terminal according to various embodiments to be described below. In addition, the operation, the control, or the control method of a watch-type mobile terminal may be realized on the watch-type mobile terminal by running at least one application program stored in the memory 170.

Before the description of various embodiments realized through the watch-type mobile terminal 100 described above, the above components will be described in more detail with reference to FIG. 1.

Regarding the wireless communication unit 110, the broadcast receiving module 111 of the wireless communication unit is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be provided in the watch-type mobile terminal 100 for simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

Examples of wireless signals include voice call signals, video (telephony) call signals, or various formats of data to support communication of text and multimedia messages.

The wireless Internet module 113, which refers to a module to access the wireless Internet, may be embedded in the mobile terminal 100 or provided outside the mobile terminal 100. The wireless Internet module 113 may transmit and/or receive wireless signals via communication networks according to wireless Internet technologies Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the watch-type mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The short-range communication module 114 may sense or recognize the wearable device, and permit communication between the wearable device and the watch-type mobile terminal 100. In addition, when the sensed wearable device is a device which is authenticated to communicate with the watch-type mobile terminal 100, the control unit 180, for example, may cause transmission of data processed in the watch-type mobile terminal 100 to the wearable device via the short-range communication module 114. Hence, a user of the wearable device may use the data processed in the watch-type mobile terminal 100 on the wearable device. For example, when a call is received in the watch-type mobile terminal 100, the user may answer the call using the wearable device. Also, when a message is received in the watch-type mobile terminal 100, the user may check the received message using the wearable device.

The location information module 115 is a module to acquire a location of the mobile terminal. As an example, the location information module 115 representatively includes a Global Position System (GPS) module, a Wi-Fi module, or both. For example, if the mobile terminal utilizes the GPS module, the position of the mobile terminal may be acquired by using the signal sent from the GPS satellite. Alternatively, if the mobile terminal utilizes the Wi-Fi module, the position of the mobile terminal may be acquired based on the information of a wireless access point (AP) for transmitting or receiving a wireless signal together with the Wi-Fi module. If necessary, the location information module 115 may any one of functions of other modules of the wireless communication unit 110 to alternatively or additionally acquire the location data of the mobile terminal. The location information module 115, which is a module used to acquire the location (or current location) of the mobile terminal, is not limited to a module to directly calculate or acquire the position of the mobile terminal.

The input unit 120 may be configured to permit various types of input to the mobile terminal 120. Examples of such input include audio, image, video, data, and user input. In order to obtain the input of video information, the watch-type mobile terminal 100 may include one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the watch-type mobile terminal 100. As another example, the cameras 121 may be located in a stereoscopic arrangement to acquire left and right images for implementing a stereoscopic image.

The microphone 122 converts external sound signal into electrical voice signal. The processed voice data may be utilized variously depending on functions (or application under running) executed by the watch-type mobile terminal 100. If desired, the microphone 122 may include assorted noise removing algorithms to remove unwanted noise generated in the course of receiving the external sound.

The user input unit 123 is a component that permits input by a user. Such user input may enable the control unit 180 to control operation of the watch-type mobile terminal 100. The user input unit 123 may include one or more of a mechanical input element (for example, a key, a button located on a front and/or rear surface or a side surface of the watch-type mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the watch-type mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, the control unit 180 processes data (or information) corresponding to proximity touches and proximity touch patterns sensed by the proximity sensor 141, and cause output of visual information on the touch screen. In addition, the control unit 180 may control the watch-type mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, a corresponding signal (signals) may be transmitted to a touch controller. The touch controller may process the received signal (signals), and then transmit corresponding data to the control unit 180. Accordingly, the control unit 180 may sense which region of the display unit 151 has been touched. Here, the touch controller may be a component separate from the control unit 180, the control unit 180, and combinations thereof.

Meanwhile, the control unit 180 may execute the same or different controls according to a type of touch object that touches the touch screen or a touch key provided in addition to the touch screen. Whether to execute the same or different control according to the object which provides a touch input may be decided based on a current operating state of the watch-type mobile terminal 100 or a currently executed application program, for example.

Meanwhile, the touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which is described as an element of the input unit 12, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the watch-type mobile terminal 100. For example, the display unit 151 may display execution screen information of an application program executing at the watch-type mobile terminal 100 or user interface (UI) and graphic user interface (GUI) information in response to the execution screen information.

The audio output module 152 is generally configured to output audio data received from the wireless communication unit 110 or stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the watch-type mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

The haptic module 153 may generate, in addition to the vibration, various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the watch-type mobile terminal 100.

An optical output module 154 may output a signal for indicating an event generation using light of a light source. Examples of events generated in the watch-type mobile terminal 100 may include message reception, call signal reception, a missed call, an alarm, a schedule notice, an email reception, information reception through an application, and the like.

A signal output by the optical output module 154 may be implemented in such a manner that the watch-type mobile terminal emits monochromatic light or light with a plurality of colors to the front surface or rear surface thereof. The signal output may be terminated as the watch-type mobile terminal senses that a user has checked the generated event.

The interface unit 160 serves as an interface for external devices to be connected with the mobile terminal 100. For example, the interface unit 160 may receive data transmitted from an external device, receive power to transfer to elements and components within the watch-type mobile terminal 100, or transmit internal data of the watch-type mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various pieces of information for authenticating authority of using the watch-type mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the watch-type mobile terminal 100 is connected with an external cradle, the interface unit 160 may serve as a passage to allow power from the cradle to be supplied to the watch-type mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The watch-type mobile terminal 100 may also be operated in relation to a network storage device that performs the storage function of the memory 170 over a network, such as the Internet.

Meanwhile, as described above, the control unit 180 may typically control the general operations of the watch-type mobile terminal 100. For example, the control unit 180 may set or release a lock state for restricting a user from inputting a control command with respect to applications when a status of the mobile terminal meets a preset condition.

The control unit 180 may also perform the controlling and processing associated with voice calls, data communications, video calls, and the like, or perform pattern recognition processing to recognize a handwriting input or a picture drawing input performed on the touch screen as characters or images, respectively. In addition, the control unit 180 may control one or a combination of those components in order to implement various exemplary embodiments disclosed herein.

The power supply unit 190 receives external power or provides internal power and supply the appropriate power required for operating respective elements and components included in the watch-type mobile terminal 100 under the control of the control unit 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. According to the present embodiment, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

First, the communication system may use mutually different wireless interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LIE) of the UMTS, the Global System for Mobile Communications (GSM), and the dike.

By way of non-limiting example only, further description will relate to a CDMA communication system, but such teachings apply equally to other system types including Orthogonal Frequency Division Multiplexing (OFDM) wireless communication as well as the CDMA wireless communication system.

A CDMA wireless communication system is shown having at least one terminal 100, at least one base station (BS) (which is named Node B or Evolved Node B), at least one of base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs may be included in the CDMA wireless communication system.

Each base station may include one or more sectors, each sector having an omni-directional antenna or an antenna pointed in a particular direction radially away from the BS. Alternatively, each sector may include two or more different antennas. Each BS may be configured to support a plurality of frequency assignments, with each frequency assignment having a particular spectrum (e.g., 1.25 MHz, 5 MHz, etc.).

The intersection of sector and frequency assignment may be referred to as a CDMA channel. The BS may also be referred to as Base Station Transceiver Subsystems (BTSs). In some cases, the term "base station" may be used to refer collectively to a BSC, and one or more BS. The base stations may also be denoted as "cell sites." Alternatively, individual sectors of a specific base station may be referred to as cell sites.

A broadcasting transmitter (BT) transmits broadcast signal to the terminals 100 operating within the system. The broadcast receiving module 111 as illustrated in FIG. 1 is typically configured inside the watch-type mobile terminal 100 to receive broadcast signals transmitted by the BT.

In addition, Global Positioning System (GPS) satellites may be connected with the CDMA wireless communication to identify the position of the watch-type mobile terminal 100. Such satellites 300 facilitate locating the position of at least one of plural watch-type mobile terminal 100. It is understood that useful position information may be obtained with greater or fewer satellites than two satellites. The position of the watch-type mobile terminal 100 may be tracked by using all technologies that is able to tract the location as well as the GPS tracking technology. In addition, at least one of the GPS satellites may alternatively or additionally be configured to provide satellite DMB transmissions.

The location information module 115 included in the mobile terminal is used for detecting, computing, or identifying the position of the mobile terminal, and may representatively include a Global Position System (GPS) module and a WiFi (Wireless Fidelity) module. If necessary, the location information module 115 may alternatively or additionally perform any of the other functions of the wireless communication unit 110 to obtain data on the position of the mobile terminal.

The GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location. However, it is difficult to measure the position of the mobile terminal by using the GPS module in a shadow area, such as an interior, of a satellite signal. Accordingly, in order to compensate for the positioning based on the GPS scheme, a WiFi positioning system (WPS) may be utilized.

The WiFi Positioning System (WPS) is a technology of tracking the position of the mobile terminal 100 by using a WiFi module included in the mobile terminal 100 and a wireless access point (AP) which transceives a wireless signal together the WiFi module. The WPS denotes a wireless local area network (WLAN) using WiFi The WiFi positioning system may include a WiFi positioning server, the mobile terminal 100, a wireless AP connected with the mobile terminal 100, and a database having arbitrary wireless AP information stored therein.

The mobile terminal 100 in connection with the wireless AP may transmit a location information request message to the WiFi positioning system.

A WiFi positioning server extracts information of a wireless AP connected with the mobile terminal 100 based on a location information request message (or signal) of the mobile terminal 100. The information of the wireless AP connected with the mobile terminal 100 may be transmitted to the Wi-Fi positioning server through the mobile terminal 100 or may be transmitted from the wireless AP to the Wi-Fi location server.

The information of the wireless AP to be extracted based on the location information request message of the mobile terminal 100 includes a MAC address, an SSID (Service Set Identification), a Received Signal Strength Indicator (RSSI), a Reference Signal Received Power (RSRP), Reference Signal Received Quality (RSRQ), channel information, privacy, a network type, signal strength, and noise strength.

The WiFi positioning server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, channel information, Privacy, Network type, latitude and longitude coordinates of the wireless AP, the name of building at which the wireless AP is located, the floor number of the building, the detailed indoor location information (GPS coordinate available) of the building, an AP owner's address, a phone number, and the like. In this case, in order to remove wireless APs provided using a mobile AP or an illegal MAC address during a location determining process, the Wi-Fi positioning server may extract only a predetermined number of wireless AP information in order of high RSSI.

Then, the Wi-Fi positioning server may extract (analyze) location information of the mobile terminal 100 using at least one wireless AP information extracted from the database. The location information of the mobile terminal 100 may be extracted (or analyzed) by comparing the included information and the received wireless AP information.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by the mobile terminal, as a position of the mobile terminal. The Cell-ID method is an implementation that is minimally complex, does not require additional costs, and location information may be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is necessary for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of the mobile terminal using a known landmark transmitter.

In addition to these position location methods, various algorithms may be used to extract (analyze) location information of a mobile terminal.

Such extracted location information of the mobile terminal 100 may be transmitted to the mobile terminal 100 through the Wi-Fi positioning server, thereby acquiring location information of the mobile terminal 100.

The mobile terminal 100 may acquire location information by being connected with at least one wireless AP. The number of wireless APs required to acquire location information of the mobile terminal 100 may be variously changed according to a wireless communication environment within which the mobile terminal 100 is positioned.

Various embodiments described herein may be implemented in a computer-readable medium, a machine-readable medium, or similar medium using, for example, software, hardware, or any combination thereof.

Figure 2:
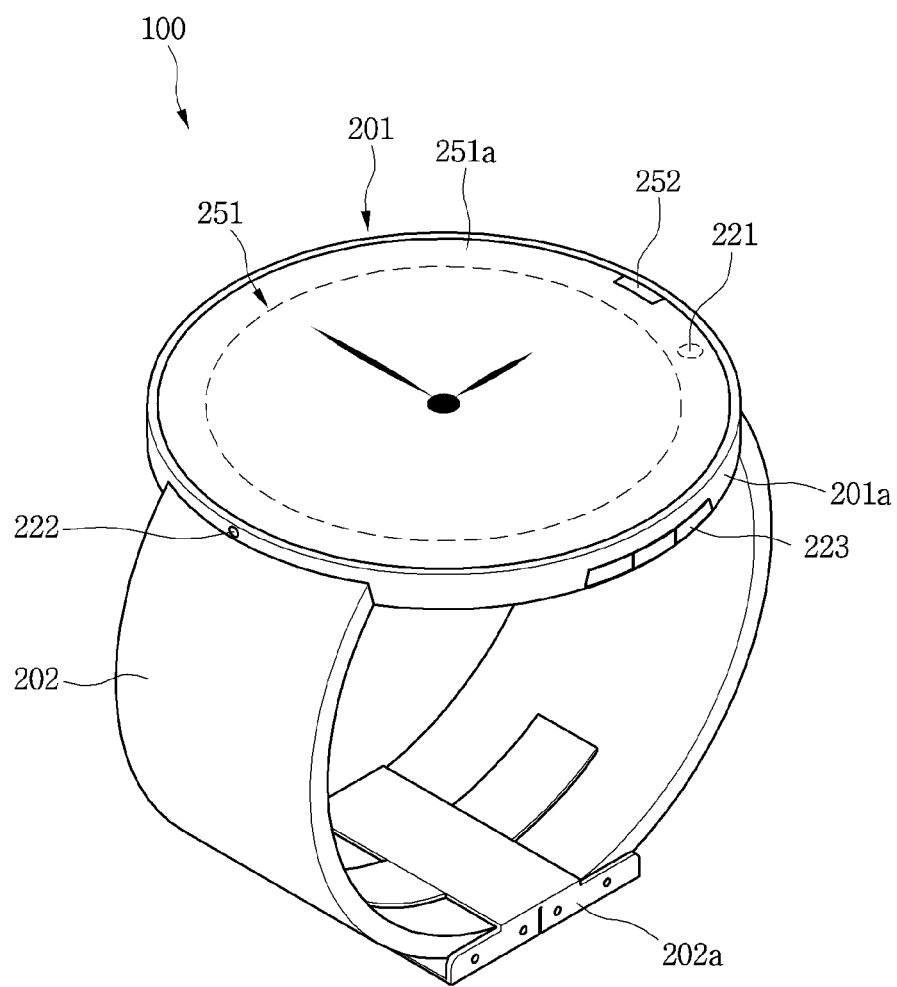
FIG. 2 is a perspective view illustrating one example of a watch-type mobile terminal related to the present invention.

FIG. 2 is a perspective view illustrating one example of the watch-type mobile terminal related to the present invention.

The watch-type mobile terminal 100 illustrated in FIG. 2 may include all components included in FIG. 1.

The display unit 251 of the watch-type mobile terminal 100 illustrated in FIG. 2 may have a circular shape, but the present invention is not limited thereto. The display unit 251 may have an oval shape or a rectangular shape. The shape of the display unit 251 of the present invention may have various shapes sufficient to provide a visually good image for a user and to help the user manipulate the display unit 251.

Referring to FIG. 2, the watch-type mobile terminal 100 includes a main body 201 including the display unit 251 and a band 202 coupled to the main body 201 and configured to be worn on the wrist. The display unit 251 may correspond to the touch screen 151 of FIG. 1.

The main body 201 includes a case that forms an outer appearance. As shown in drawing, the case may include a first case 201a and a second case 201b which define an internal space for receiving various electronic components. However, the present invention is not limited thereto, but one case is included to provide the internal space, so that the watch-type mobile terminal 100 may be realized in the form of a unibody.

The watch-type mobile terminal 100 may be configured to enable wireless communication, and the main body 201 may be equipped with an antenna for wireless communication. Meanwhile, the performance of the antenna may be enhanced through the case. For example, a case including a conductive material may be configured to electrically be connected with the antenna and thus to expand the ground or a radiation area.

The display unit 251 may be disposed on the front surface of the main body 201 to output information. The display unit 251 may include a touch sensor so that the display unit 251 may be realized as a touch screen. As illustrated in drawings, a window 251a of the display unit 251 may be mounted on the first case 201a to form a front surface of a terminal body together with the first case 201a. The case may be referred to as a bezel.

The main body 201 may include a sound output unit 252, a camera 221, a microphone 222, a user input unit 223, and the like. In the case that the display unit 251 is realized as a touch screen, the display unit 251 may serve as a user input unit 223. Accordingly, the main body 201 may not have a separate key.

The band 202 is worn on the wrist to surround a wrist, and may be formed of a flexible material for easy wearing. For example, the band 202 may be formed of leather, rubber, silicone, synthetic resin material, or the like. In addition, the band 202 is provided detachably from the main body 201. Accordingly, the band 202 may be replaceable with various shapes of bands according to the preferences of a user.

Meanwhile, the band 202 may be used to expand the performance of the antenna. For example, the band 202 may include a ground extension part (not illustrated) that is electrically connected to the antenna to expand the ground area.

The band 202 may include a fastener 202a. The fastener 202a may be by a buckle, a snap-fit hook structure, or Velcro (trademark), and may include a section having elasticity or elastic material. The present drawing illustrates an example that the fastener 202a is realized in the shape of a buckle.

Figure 3:
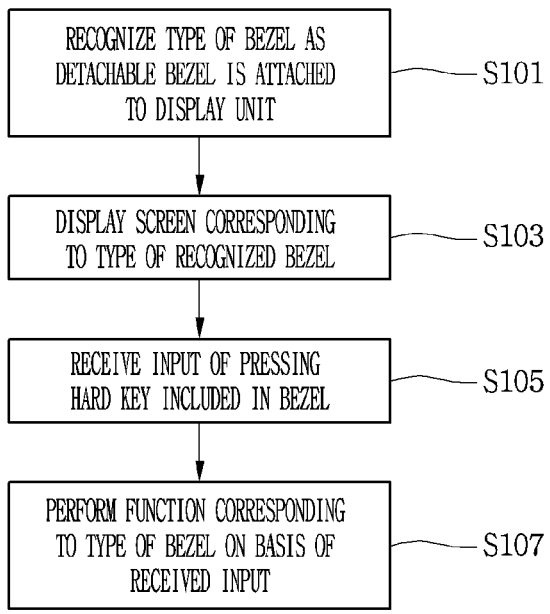
FIG. 3 is a flowchart showing the operating method of the watch-type mobile terminal according to one embodiment of the present invention.

FIG. 3 is a flowchart showing the operating method of the watch-type mobile terminal according to one embodiment of the present invention.

The control unit 180 of the watch-type mobile terminal 100 may recognize the type of the bezel as the bezel detachable from the display unit 251 is attached to the display unit 251 (S101).

According to one embodiment, the bezel may be a framework having a structure detachable from the display unit 251. In other words, the bezel may be used to be attached to or detached from the display unit 251. The bezel may include a frame and at least one hard key for a user input.

According one embodiment, the type of the bezel may be varied depending on at least one of the number of hard keys included in the bezel, the positions that the hard keys are disposed, the material of the bezel, and the color of the bezel. For example, a first-type bezel may be a bezel including a frame formed of leather or rubber and one hard key. A second-type bezel may be a bezel including a frame formed of leather or steel and two hard keys. A third-type bezel may be a bezel including a frame formed of leather or steel and three hard keys. A fourth-type bezel may be a bezel including a frame formed of titanium or polyurethane and five hard keys. The type of the bezel will be described with reference to FIGS. 4 to 7.

FIGS. 4 to 7 are views illustrating various types of bezels according to the present invention.

Figure 4:
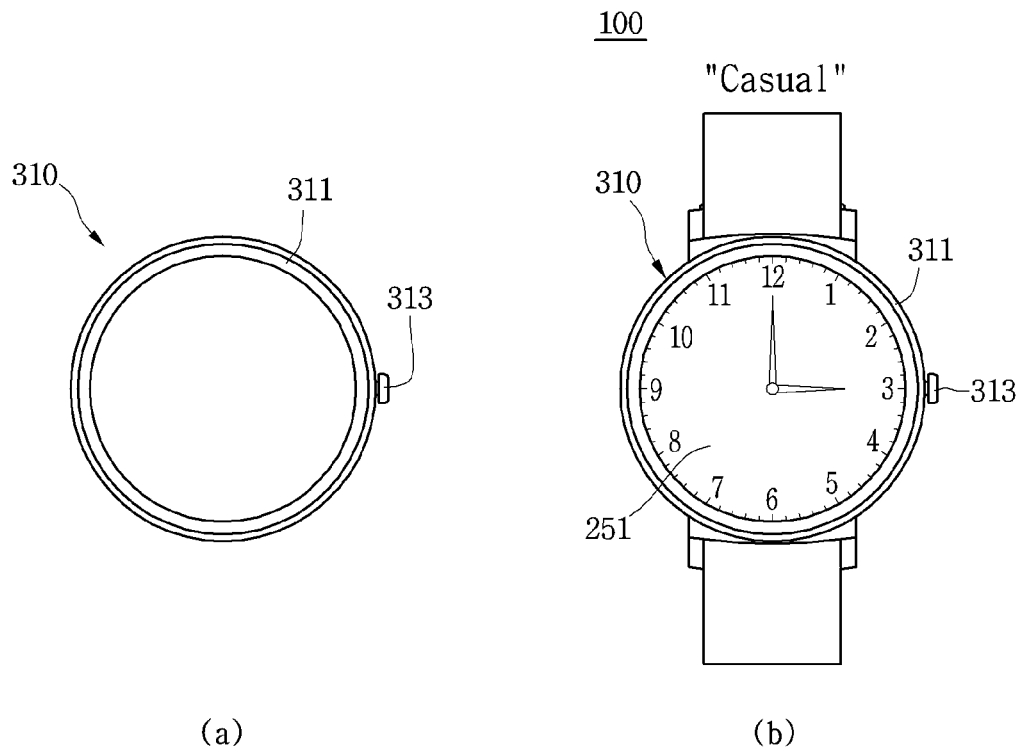
FIGS. 4 to 7 are views illustrating various types of bezels according to the present invention.

FIG. 4 is a view illustrating a first-type bezel 310. Referring to FIG. 4A, the first-type bezel 310 may include a frame 311 formed of leather or rubber and one hard key 313 disposed at one side of the frame 311. FIG. 4B illustrates the watch-type mobile terminal 100 in which the first-type bezel 310 is coupled to the display unit 251. The watch-type mobile terminal 100 illustrated in FIG. 4B includes only one hard key 313, thereby providing a simple and casual fell for a user.

Hereinafter, description will be made with reference to FIGS. 5 and 6.

Figure 5:
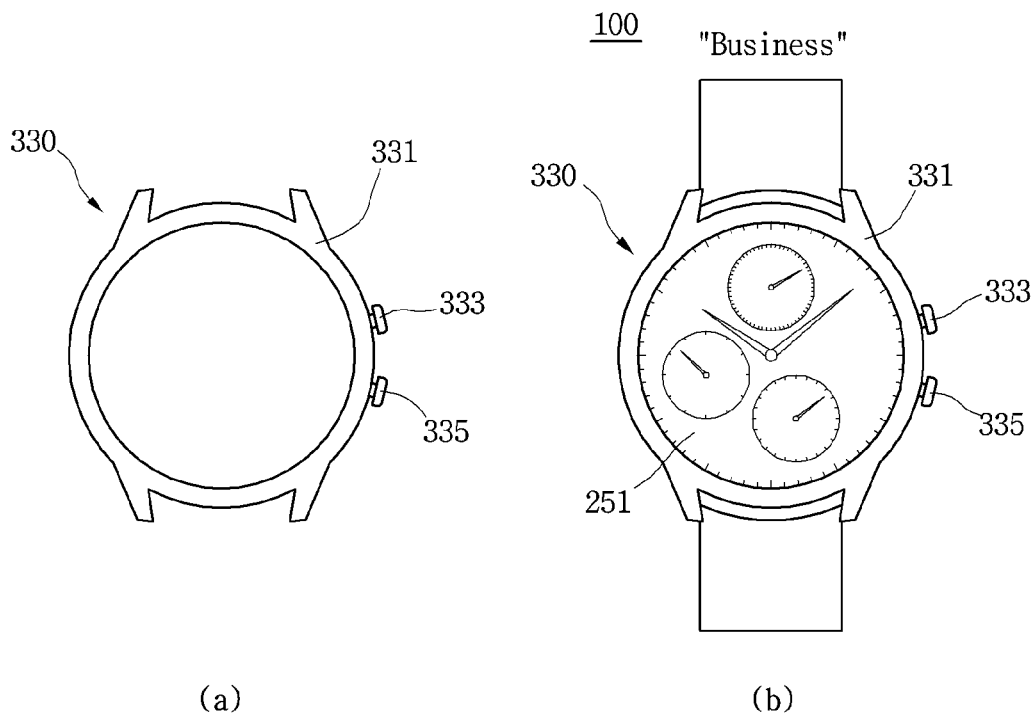
Figure 6:
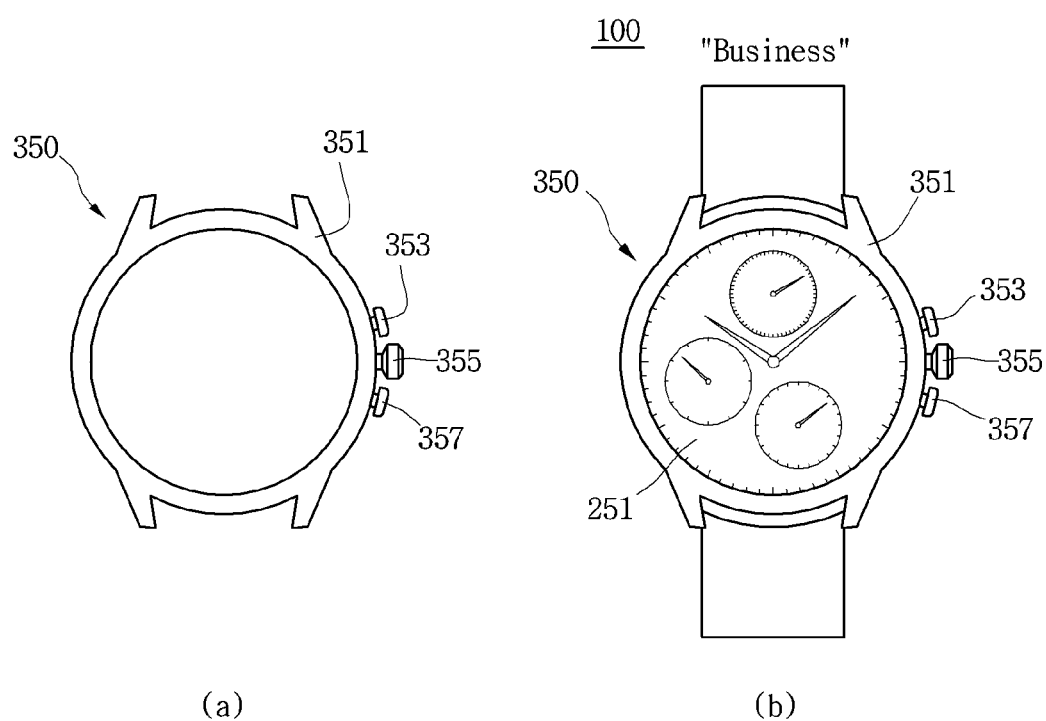

FIG. 5 is a view illustrating a second-type of bezel 330, and FIG. 6 is a view illustrating a third-type bezel 350. Referring to FIG. 5A, the second-type bezel 310 may include a frame 331 formed of rubber or steel and two hard keys 333 and 335 disposed at one side of the frame 331. FIG. 5B illustrate the watch-type mobile terminal 100 in which the second-type bezel 330 illustrated in FIG. 5A is coupled to the display unit 251. The watch-type mobile terminal 100 illustrated in FIG. 5B includes the two hard keys 333 and 335 to allow a user to use the watch-type mobile terminal for the purpose of business.

Referring to FIG. 6A, the third-type bezel 350 may include a frame 351 formed of leather or steel and two hard keys 353, 355, and 357 disposed at one side of the frame 351. FIG. 6B illustrate the watch-type mobile terminal 100 in which the third-type bezel 350 illustrated in FIG. 6A is coupled to the display unit 251. The watch-type mobile terminal 100 illustrated in FIG. 6B includes the three hard keys 353, 355, and 357 to allow a user to use the watch-type mobile terminal for the purpose of business.

Figure 7:
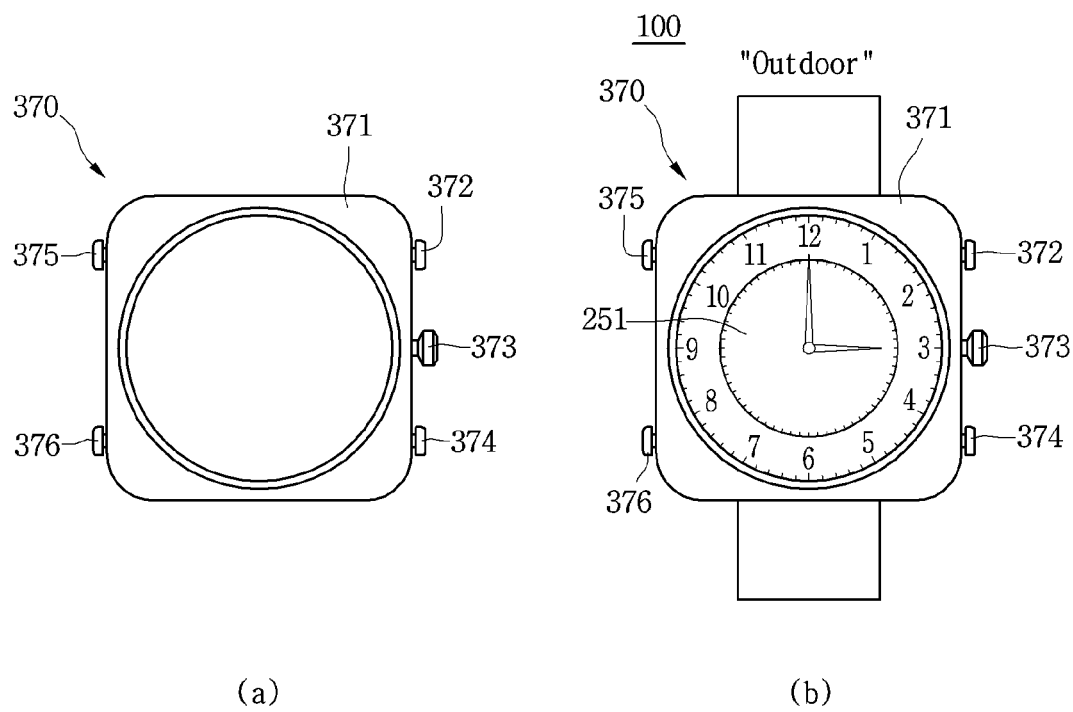

Hereinafter, description will be made with reference to FIG. 7.

Referring to FIG. 7A, a four-type bezel 370 may include a frame 371 formed of titanium or polyurethane and five hard keys 372, 373, 374, 375, and 376 disposed at one side of the frame 371. FIG. 7B illustrate the watch-type mobile terminal 100 in which the four-type bezel 370 illustrated in FIG. 7A is coupled to the display unit 251. The watch-type mobile terminal 100 illustrated in FIG. 7B includes the five hard keys 372, 373, 374, 375, and 376 to allow a user to use the watch-type mobile terminal for an outdoor purpose.

Hereinafter, description will be made with reference to FIG. 3 again.

According to one embodiment, the control unit 180 of the watch-type mobile terminal 100 may recognize the type of the bezel through a specific absorption rate (SAR) sensor. The SAR sensor may be a sensor that senses the electrical capacity of a conductive object. The memory 170 may store the type of a bezel corresponding to each of the plurality of electrical capacities. The control unit 180 may determine the type of the bezel corresponding to the electric capacitance sensed by the SAR sensor through the memory 170. [

According to another embodiment, the control unit 180 of the watch-type mobile terminal 100 may recognize the type of the bezel through the color sensor. The watch-type mobile terminal 100 may include a color sensor provided at an outer portion of the display unit 251. When the bezel is attached to the display unit 251, the control unit 180 may determine the color of the attached bezel to recognize the type of the bezel.

According to another embodiment, the control unit 180 of the watch-type mobile terminal 100 may recognize the type of the bezel using a metal code. The memory 170 of the watch-type mobile terminal 100 may store a metal code corresponding to each of a plurality of bezels in different types. The control unit 180 may acquire the metal code of the bezel attached to the display unit 251 and may search the memory 170 to determine the type of the bezel corresponding to the acquired metal code. Accordingly, the control unit 180 may recognize the type of the bezel attached to the display unit 251.

A method of recognizing the type of the bezel detachable from the display unit 251 of the watch-type mobile terminal 100 will be described with reference to FIGS. 8 and 9.

Figure 8:
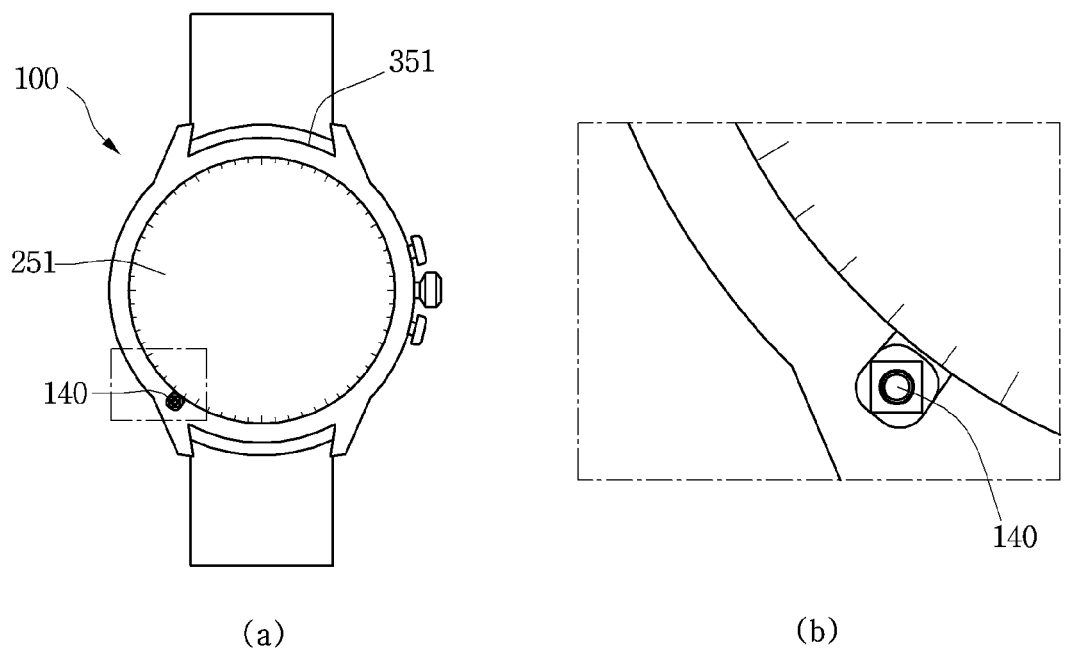
FIGS. 8 to 9 are views illustrating a method of recognizing the type of a bezel detachable from a display unit according to an embodiment of the present invention.
Figure 9:
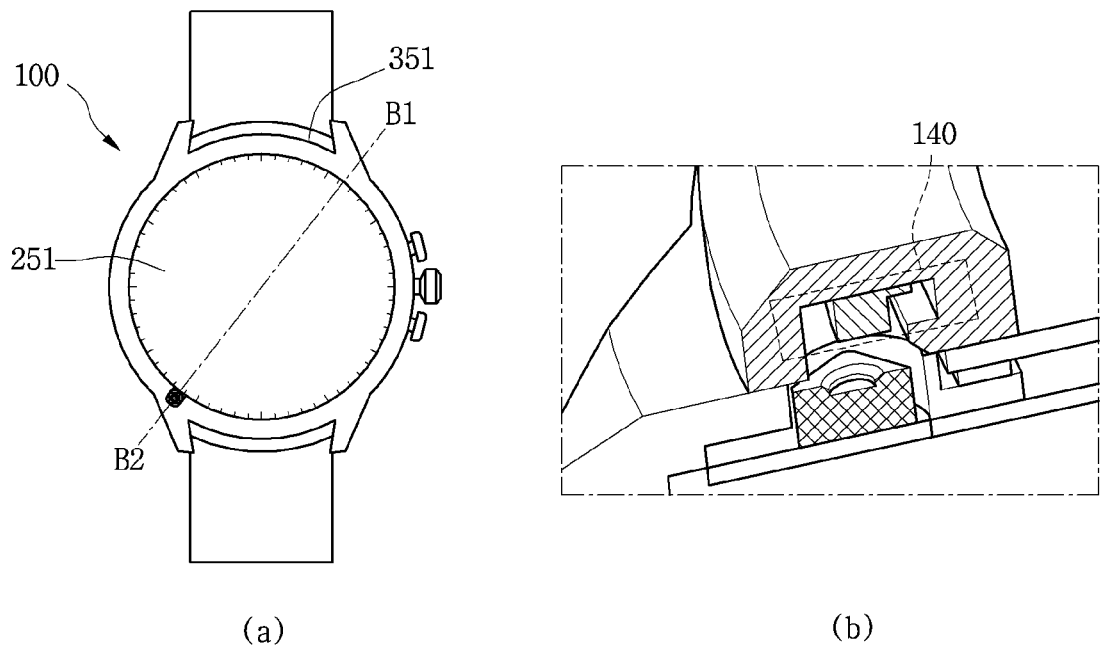

FIGS. 8 to 9 are views illustrating the method of recognizing the type of the bezel detachable from the display unit according to an embodiment of the present invention.

In particular, FIG. 8 is a view illustrating the embodiment of recognizing the type of the bezel through the sensing unit 140 of the watch-type mobile terminal 100, and FIG. 9 is a view illustrating the embodiment of recognizing the type of the bezel through the metal code.

In addition, description will be made with reference to FIGS. 8 and 9 on the assumption that that the third-type bezel 351 is attached to the display unit 251.

Referring to FIGS. 8A and 8B, the watch-type mobile terminal 100 may include the sensing unit 140 provided at one side of the display unit 251. The sensing unit 140 may include at least one of the SAR sensor and a color sensor. The SAR sensor may sense an electrical capacity generated when the third-type bezel 351 is attached to the display unit 251. The control unit 180 may recognize that the bezel corresponding to the sensed electric capacitance is the third-type bezel 351. The color sensor may detect the color of the third-type bezel 351 as the third-type bezel 351 is attached to the display unit 251. The control unit 180 may recognize that the bezel corresponding to the detected color is the third-type bezel 351.

Hereinafter, description will be made with reference to FIG. 9.

FIG. 9A is a plan view illustrating the watch-type mobile terminal 100 in which the third-type bezel 351 is attached to the display unit 251. FIG. 9B is a sectional view taken along line B1-B2 of the plan view illustrated in FIG. 9A. Referring to FIG. 9B, the watch-type mobile terminal 100 may include the sensing unit 140 for recognizing the metal code of the bezel provided at one side of the display unit 251. The control unit 180 may recognize the bezel corresponding to the metal code as the third-type bezel 351 by analyzing the metal code of the bezel, which is acquired through the sensing unit 140.

Hereinafter, description will be made with reference to FIG. 3 again.

The control unit 180 of the watch-type mobile terminal 100 displays a screen corresponding to the type of the recognized bezel on the display unit 251 (S103).

According to one embodiment, when the bezel is attached to the display unit 251, the control unit 180 may control the display unit 251 to display the screen corresponding to the type of the recognized bezel. In other words, screens displayed through the display unit 251 may be different from each other depending on the type of the bezel attached to the display unit 251. For example, when the first-type bezel 310 illustrated in FIG. 4 is attached to the display unit 251, the control unit 180 may control the display unit 251 to display a basic clock screen. When the second-type bezel 330 illustrated in FIG. 5 or the third-type bezel 350 illustrated in FIG. 6 is attached to the display unit 251, the control unit 180 may control the display unit 251 to display a clock screen including a chronograph. When the fourth-type bezel 370 illustrated in FIG. 7 is attached to the display unit 251, the control unit 180 may control the display unit 251 to display a clock screen suitable for outdoor activities.

The control unit 180 of the watch-type mobile terminal 100 receives an input of pressing a hard key included in the bezel (S105) and performs a function corresponding to the type of the bezel recognized based on the received input (S107).

Hereinafter, steps S105 and S107 will be described according to various embodiments.

Figure 10:
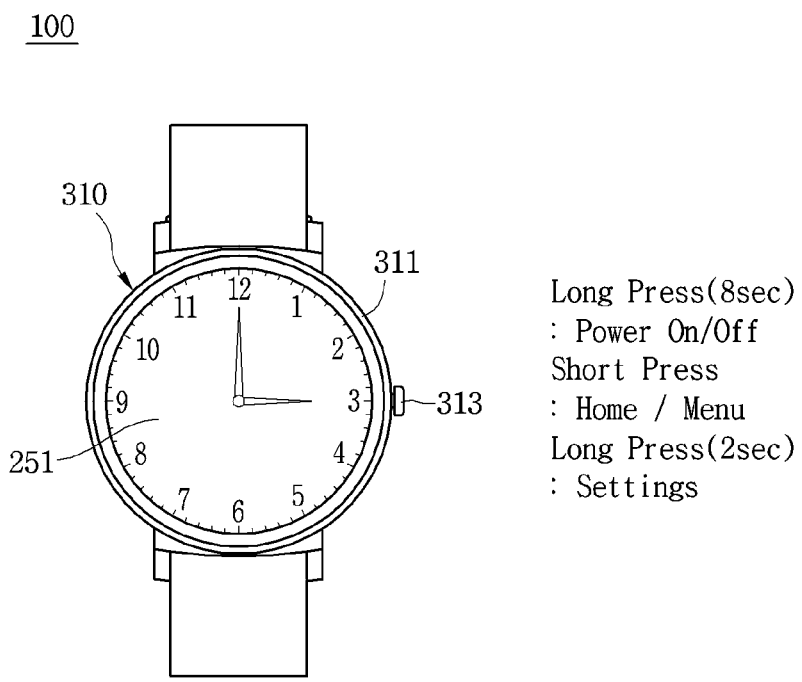
FIG. 10 is a view illustrating a function executable in response to an input of pressing the hard key included in the first-type bezel according to an embodiment of the present invention.

FIG. 10 is a view illustrating a function executable in response to an input of pressing the hard key included in the first-type bezel according to an embodiment of the present invention.

Referring to FIG. 10, there is shown the watch-type mobile terminal 100 in which the first-type bezel 310 including one hard key 313 is attached to the display unit 251. When receiving the input of pressing the hard key 313 for 8 seconds, the control unit 180 may power on or power off the watch-type mobile terminal 100. When receiving the input of pressing the hard key 313 for 0.5 seconds, the control unit 180 may control the display unit 251 to display a home screen or a menu screen. When receiving the input of pressing the hard key 313 for 2 seconds, the control unit 180 may control the display unit 251 to display settings. In this case, 8 seconds, 0.5 seconds, or 2 seconds are provided only for the illustrative purpose.

Hereinafter, description will be made regarding the function executable in response to the input of pressing hard keys provided in the second-type bezel 330.

Figure 11:
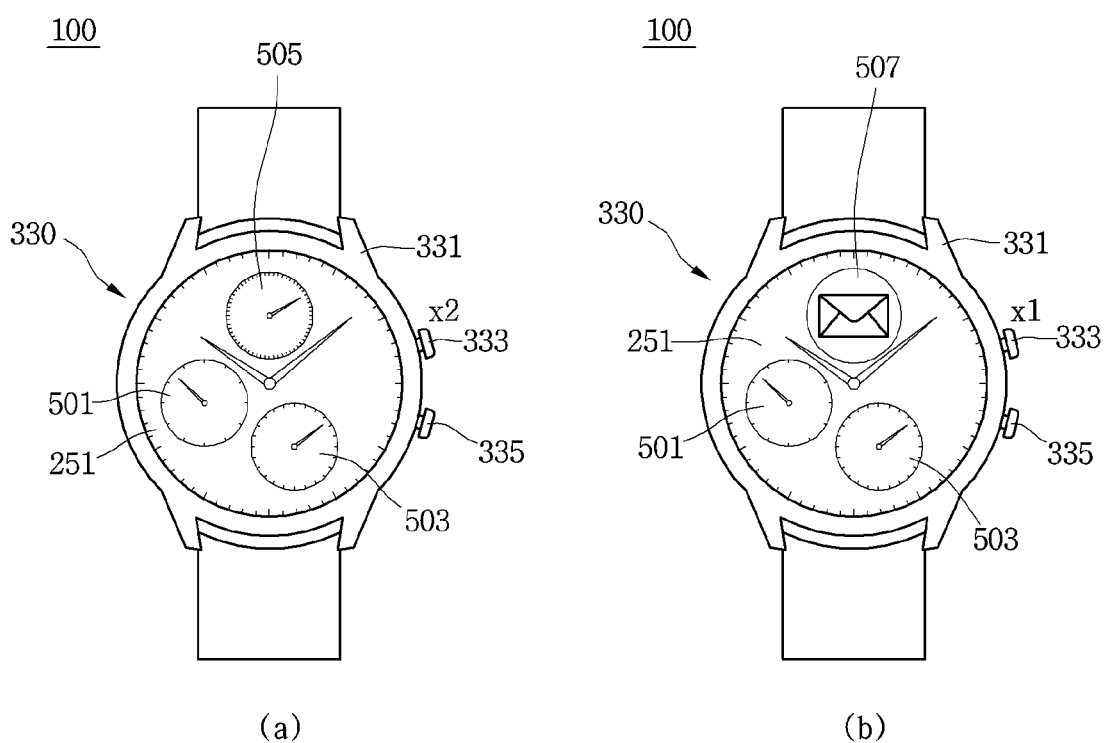
FIGS. 11 to 13 are views illustrating a function executable in response to an input of pressing the hard key included in the second-type bezel according to an embodiment of the present invention.
Figure 12:
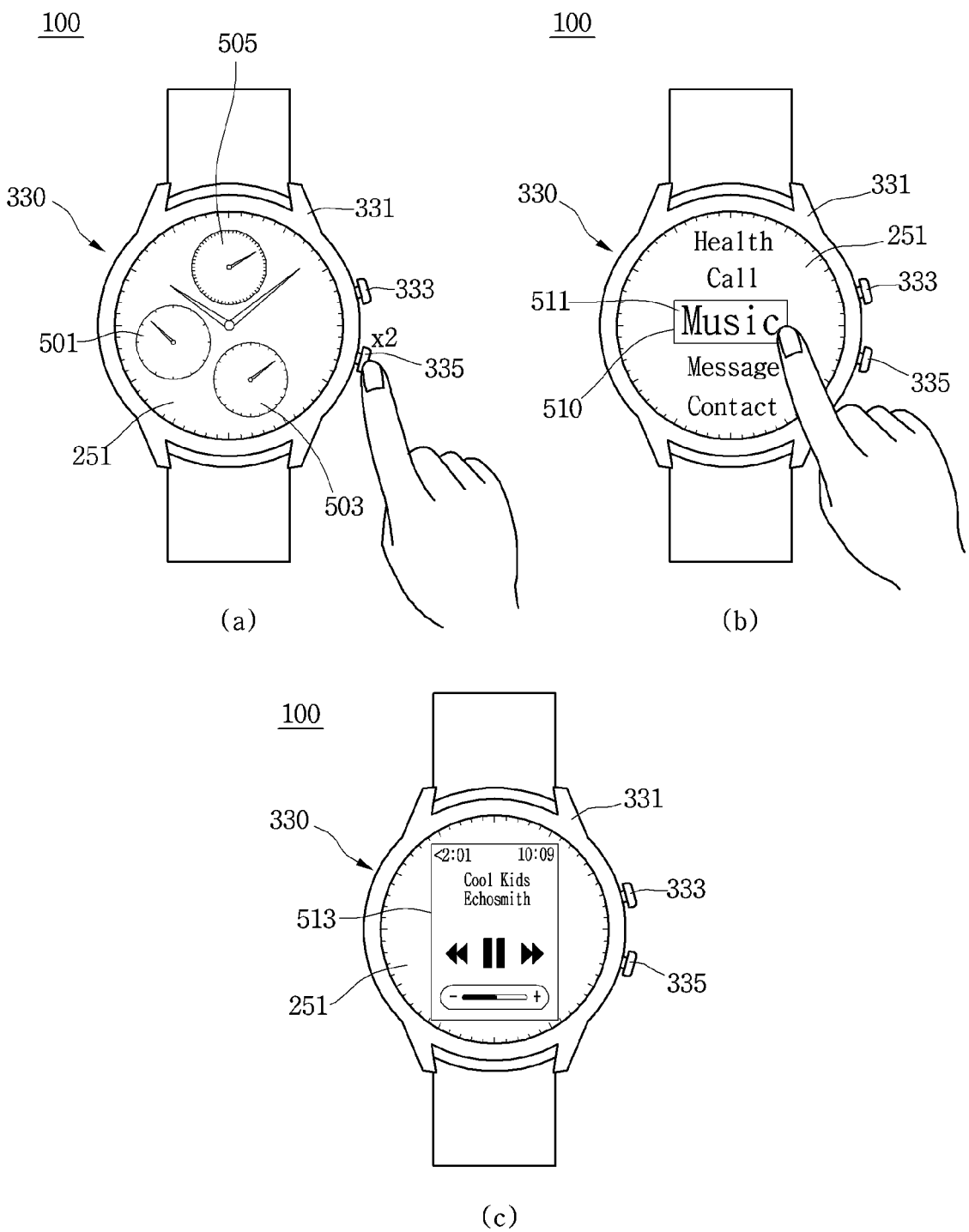
Figure 13:
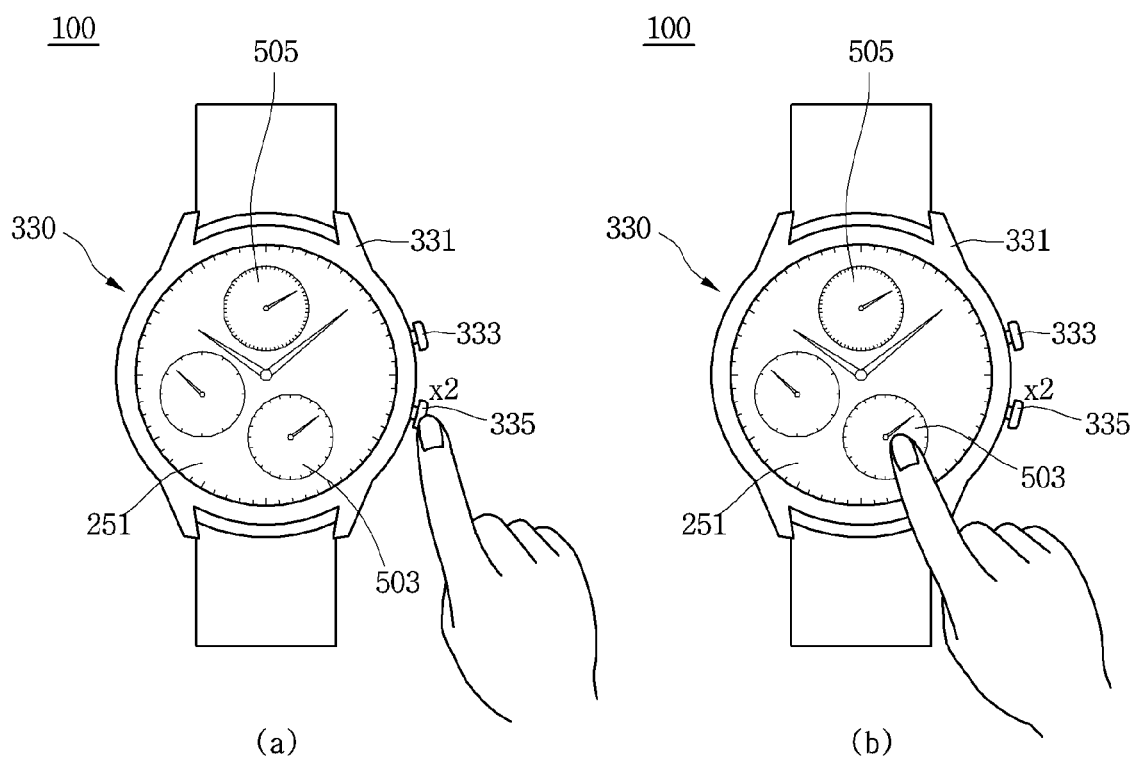
Figure 14:
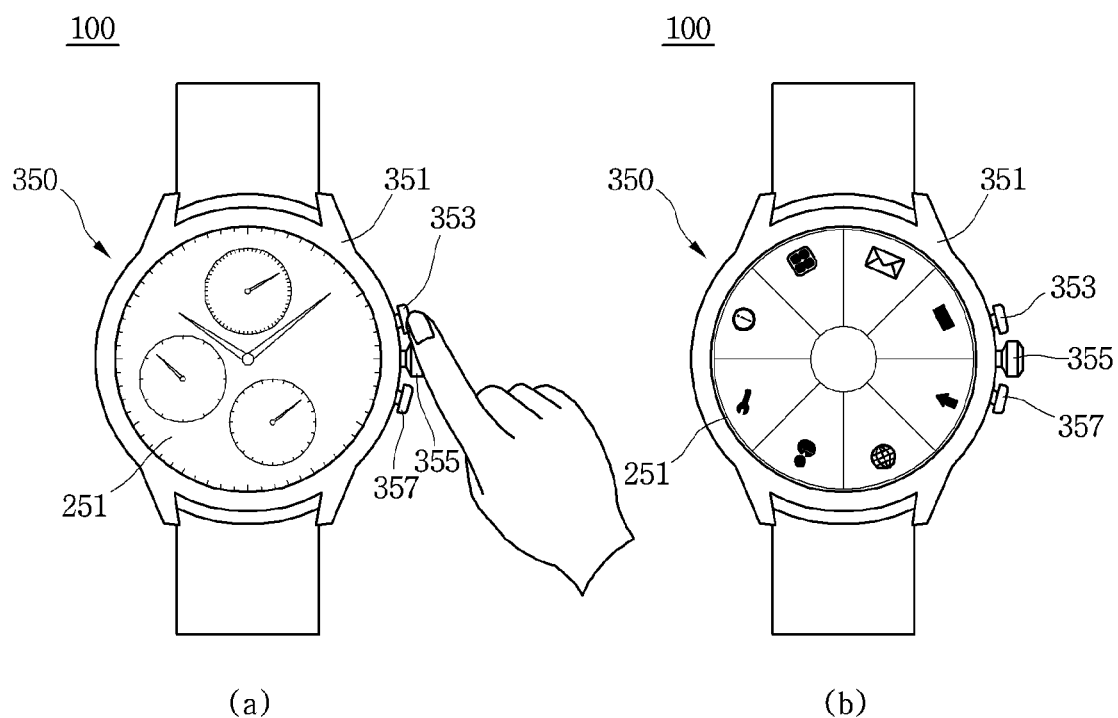

FIGS. 11 to 13 are views illustrating a function executable in response to an input of pressing the hard key included in the second-type bezel according to an embodiment of the present invention.

Referring to FIG. 11A, there is shown the watch-type mobile terminal 100 in which the second-type bezel 330 including two hard keys 333 and 335 are attached to the display unit 251. The display unit 251 may display a basic clock screen and at least one of chronographs 501, 503, and 505. The chronograph may be a dashboard having a function of informing the time of a different zone, a stopwatch function, or a function of measuring a speed, and a distance.

The function executed in response to the input of pressing the first hard key 333 may include a function executed in response to the input of pressing the hard key 313 described with reference to FIG. 10. When receiving the input of pressing the first hard key twice for one second, the control unit may change the operation mode of the watch-type mobile terminal 100 to a chronograph editing mode in which the chronograph may be edited. The chronograph editing mode of the chronograph may be a mode of changing at least one of chronographs 501, 503, and 505 displayed on the display unit 251 to another type of a chronograph, or an application (Apple) icon corresponding to a specific application. When the watch-type mobile terminal 100 enters into the chronograph editing mode, the first hard key 333 may operate as an up button for moving a highlight box for selecting a specific item upward, and the second hard key 335 may operate as a down button for moving the highlight box downward. When receiving the input of pressing the first hard key 333 operating as the up button, the control unit 180 may control the display unit 251 to change the chronograph 507 to a message icon 509 representing a message application and to display the chronograph 507 as illustrated in FIG. 11B.

Hereinafter, description will be made with reference to FIG. 12.

Referring to FIG. 12A, when receiving an input of pressing the second hard key 335 twice, the control unit 180 the watch-type mobile terminal 100 in a quick access mode. The quick access mode may be a mode in which the control unit 180 quickly accesses applications installed in the watch-type mobile terminal 100 and executes a specific application. When receiving of pressing the second hard key 335 twice, the control unit 180 may control the display unit 251 to display an application list 510 including information on a plurality of applications on the screen of the display unit 251 as illustrated in FIG. 12B. The application list 510 may include at least one of the name of each application and an application icon corresponding to each application. When receiving an input of touching a music character 511 representing the name of a music application, the control unit 180 may execute the music application and may control the display unit 251 to display an execution screen 513 of the music application, as illustrated in FIG. 12C.

Description will be made with reference to FIG. 13.

Referring to FIG. 13A, when receiving an input for pressing the second hard key 335 twice, the control unit 180 operates the operation mode of the watch-type mobile terminal 100 in a chronograph setting mode. The chronograph setting mode may be a mode of setting the time and the arrangement of the chronograph displayed on the display unit 251. In the state that the watch-type mobile terminal 100 enters into the chronograph setting mode, the input of touching the chronograph 503 may be received as illustrated in FIG. 13B. The chronograph 503 may have a timer function. In the chronograph setting mode, the first hard key 333 may operate as an upper key, and the second hard key 335 operates as a lower key. The time of the chronograph 503 may be adjusted depending on an input of pressing any one of the first hard key 333 and the second hard key 335. If the input of touching the chronograph 503 is received after the time of the chronograph 503 is adjusted, the control unit 180 may set the timer function of the chronograph 503 to the adjusted time.

Hereinafter, description will be made regarding the function executable in response to the input of pressing the hard keys provided in the third-type bezel 350.

FIGS. 14 to 18 are views illustrating functions executable in response to the input of pressing the hard key included in the third-type bezel according to various embodiments of the present invention.

FIG. 14A illustrates the watch-type mobile terminal 100 in which the third-type bezel 350 including three hard keys 353, 355, and 357 is attached to the display unit 251. The watch-type mobile terminal 100 may be utilized as a smartphone through the three hard keys 353, 355, and 357 included in the third-type bezel 350 For example, the first hard key 353 may be used as a key for displaying one or more menu icons corresponding to one or menus. The second hard key 355 may be used as a key for displaying a home screen. The third hard key 357 may be used as a key for executing a backward function of returning to a previous screen. For example, when receiving an input of pressing the first hard key 353, the control unit may control the display unit 251 to display a plurality of menu icons for setting a plurality of functions, as illustrated in FIG. 14B. The user may select any one of the menu icon to access a function corresponding to the selected menu icon.

Hereinafter, description will be made with reference to FIG. 15.

Referring to FIG. 15A, the watch-type mobile terminal 100 may be in a state of receiving a call signal from a counterpart terminal. In other words, a user may be in a communication state with the counterpart. The display unit 251 of the watch-type mobile terminal 100 displays a call screen. When receiving an input of pressing the first hard key 353 while the watch-type mobile terminal 100 is receiving the call signal, the control unit 180 may control the display unit 251 to display a plurality of items. The items include a first item 521, which is able to execute a specific function through the first hard key 353, a second item 523, which is able to execute a specific function through the second hard key 355, and a third item 525 which is able to execute a specific function through the third hard key 357.

Figure 15:
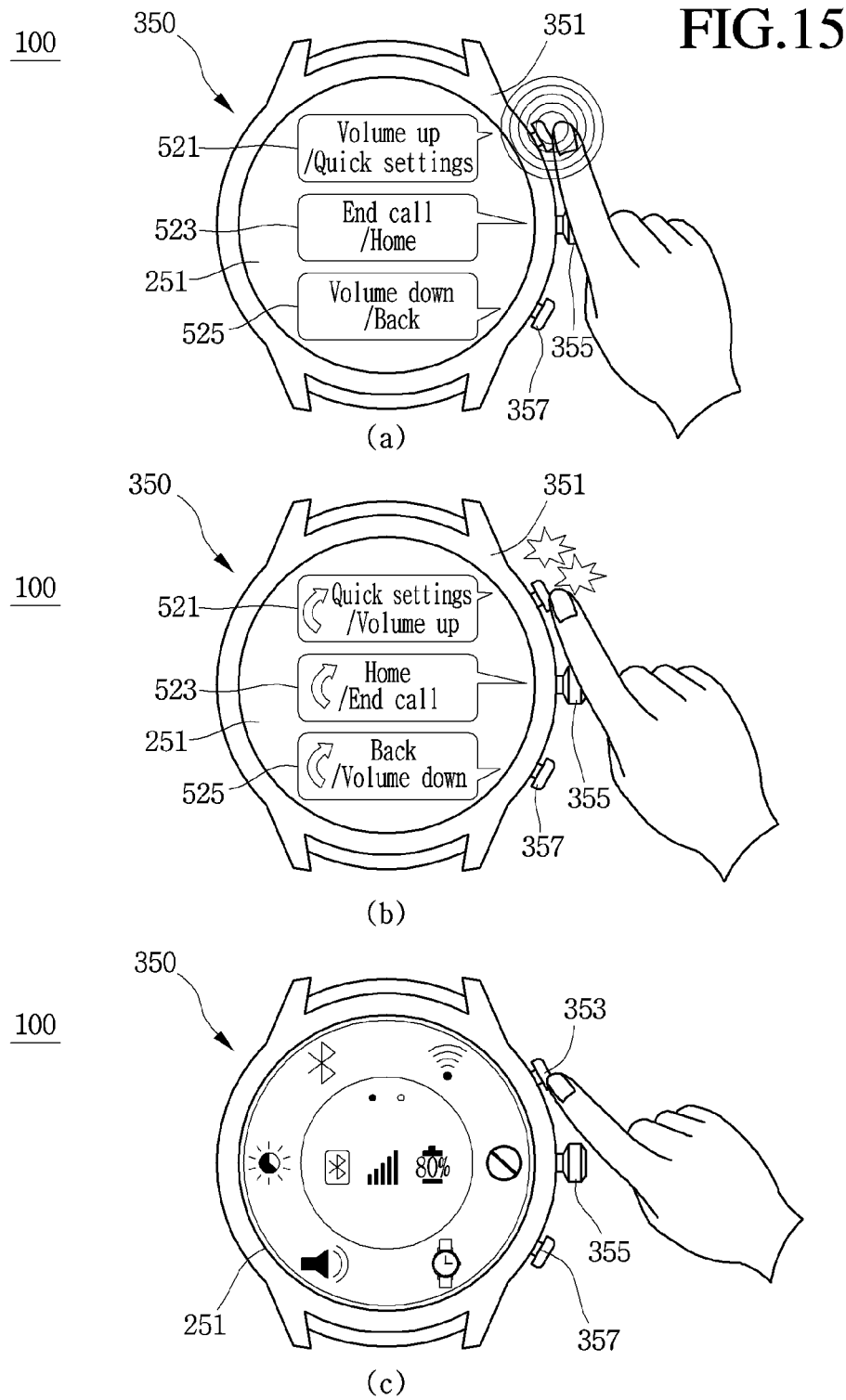

In FIG. 15 (a), only the items related to the call may be in an activation state. The activation state may indicate a state in which the relevant item is highlighted and immediately selected. The first item 521 may include a volume up item for increasing the volume and a quick setting item for performing the quick setting. In FIG. 15A, the volume up item may be in the activation state, and the quick setting item may be in a deactivation state. The second item 523 may include a call end item for ending the call and a home item for entering the home screen. The call end item may be in the activation state, and the home item may be in the deactivation state. The third item 525 may include a volume down item for reducing the volume and a backward item for showing the previous screen. In FIG. 15 (a), the volume down item may be in the activation state and the backward item may be in the deactivation state.

The user may select the volume up item included in the first item 521 or may increase the volume for the call by pressing the first hard key 353. In addition, the user may select the second item 523 or may access the home screen by pressing the second hard key 355. In addition, the user may select the volume down item included in the third item 525 or may reduce the volume for the call by pressing press the third hard key 357.

In FIG. 15A, when receiving the input of pressing the first hard key 353, the control unit 180 may change the activation state of the volume up item and the quick setting item included in the first item 521, as illustrated in FIG. 15B. In detail, the control unit 180 may change the arrangement of the volume up item and the quick setting item, may change the state of the volume up item to the deactivation state, and may change the state of the quick setting item to the activation state. In addition, the control unit 180 may change the call end item included in the second item 523 to the deactivation state and may change the home item to the activation state in response to the input of pressing the first hard key 353 twice. In addition, the state change of the call end item and the home item included in a second item 525 may be performed by an input of pressing the second hard key 355 twice. In addition, the control unit 180 may change the state of the volume down item included in the third item 525 to the deactivation state and may change the state of the backward item to the activation state in response to the input of pressing the first hard key 353 twice. In addition, the state of the volume down item and the backward item included in the third item 525 may be changed by input of pressing the third hard key 357 twice.

Meanwhile, in FIG. 15B, when receiving an input of pressing the first hard key 353, the control unit 180 may set the activated quick setting item and may control the display unit 251 to display a plurality of menus provided through the quick setting item, as illustrated in FIG. 15C. In FIG. 15C, when receiving an input of pressing the first hard key 353 twice again, the control unit 180 may control the display unit 251 to display the call screen.

Hereinafter, description will be made regarding an embodiment in which the functions of the smartphone may be controlled through the watch-type mobile terminal 100 connected with the smartphone.

FIG. 16 is a view illustrating an embodiment in which a function of a smartphone may be controlled through the watch-type mobile terminal 100 connected with the smartphone of a user.

Referring FIG. 16A, the smartphone 10 and the watch type mobile terminal 100 are connected with each other through short range radio wireless communication. It is assumed that the smartphone 10 is in a state of receiving a call signal. When receiving an input for pressing the first hard key 353, the control unit 180 may control the display unit 251 to display a plurality of items. The items include a first item 531 for performing a specific function through the first hard key 353, a second item 533 for performing a specific function through the second hard key 355, and a third item 535 for performing a specific function through the third hard key 357. The control unit 180 may recognize that the smartphone 10 is in the state of receiving the call signal and may control the display unit 251 to display the items for controlling the functions of the smartphone 10 related to the call. For example, the first item 531 may include a phone volume up item for turning up the volume of the smartphone 10. The second item 533 may include a phone call end item for ending of the call on the smartphone 10. The third item 535 may include a phone volume down item for turning down the volume of the smartphone 10.

Items for controlling the call function of the smartphone 10 in each item may be in a deactivation state. When receiving an input of pressing the first hard key 353 twice, the control unit 180 activates the items for controlling the call function of the smartphone 10, as illustrated in FIG. 16B.

The user may easily control the call function of the smartphone 10 by pressing a specific hard key.

Hereinafter, description will be made regarding an example of controlling the function of an application executed through the manipulation of the hard key when a specific application is being executed in the background.

FIG. 17 is a view illustrating the example of controlling the function of an application executed through the manipulation of the hard key when the specific application is being executed in the background according to an embodiment of the present invention.

Hereinafter, description will be made with reference FIG. 17 on the assumption that a music playback application allowing the watch-type mobile terminal 100 to play back an audio is being executed in the background. The state that the music playback application is being executed in the background may indicate a state that the execution screen of the music playback application is not displayed on the display unit 251, but the execution screen of another application is displayed. In other words, the user may be performing multitasking through the watch-type mobile terminal 100.

Referring to FIG. 17A, when receiving an input of pressing the first hard key 353 in the state that the music playback application is being executed in the background, the control unit 180 may control the display unit 251 to display a plurality of items including an item for a function related to the control of music playback. In detail, when receiving an input of pressing the first hard key 353 in the state that the music playback application is being executed in the background, the control unit 180 may control the display unit 251 to display a first item 541 including a quick setting item and a music volume up item for turning up the volume of the music being played back, a second item 543 including a home item and a stop/playback item for pausing the playback of music or for starting the playback of the music, and a third item 545 including a backward item and a music volume down item for turning down the volume of the music being played back.

In FIG. 17A, when receiving the input of pressing the first hard key 353 twice, the control unit 180 may change the activation states of a quick setting item and a music volume up item included in the first item 541 as illustrated in FIG. 17B. In detail, the control unit 180 may change the arrangement of the music volume up item and the quick setting item, change the state of the music volume up item to the activation state, and change the state the quick setting item to the deactivation state. Similarly, in the case of a second item 543 and the third item 545, the state of the time related to the playback of the music may be changed to the activation state. Thereafter, the user may easily control the playback of the music through the input of pressing the hard key.

Hereinafter, description will be made regarding notification information provided as any one of hard keys included in the third-type bezel is pressed when the hard key corresponds to a notification function.

FIG. 18 illustrates notification information provided as any one of hard keys included in the third-type bezel is pressed when the hard key corresponds to a notification function according to the embodiment.

In FIG. 18, it is assumed that the first hard key 353 included in the third-type bezel 353 is set to correspond to a notification function of informing the user of various information. In other words, when receiving an input of pressing the first hard key 353, the control unit 180 may control the display unit 251 to display brief notification information 601 of notifying the user of how many text messages were received, how many e-mails were received, and how many missed calls were received. When receiving an input of pressing the first hard key 353 twice while the brief notification information 601 is displayed, the control unit 180 may control the display unit 251 to display a notification screen for providing the detailed notification information as illustrated in FIG. 18B. The user may press the first hard key 353 again to check the details of the missed call, may press the second hard key 355 to check the details of the received text message, and may press the third hard key 357 to check the details of the received e-mail.

Hereinafter, a function executable in response to the input of pressing the hard keys included the fourth-type bezel 370 will be described.

FIG. 19 is a view illustrating a function executable in response to an input of pressing the hard keys included in the fourth-type bezel according to an embodiment of the present invention.

Referring to FIG. 19A, there is shown the watch-type mobile terminal 100 in which the fourth-type bezel 370 is attached to the display unit 251. When receiving the input of pressing the second hard key 373, the control unit 180 may allow the operation mode of the watch-type mobile terminal 100 to be a sports mode for providing a function specified for a particular sports item. In detail, the control unit 180 may control the display unit 251 to display a sports item screen 603 including a plurality of sports items as illustrated in FIG. 19B as the input of pressing the second hard key 373 is received. If a request for selecting a hiking item is received, the control unit 180 may associate each of the hard keys provided in the fourth-type bezel 370 with a function of providing information related to hiking.

For example, when the hiking item is selected and the first hard key 372 is pressed, the control unit 180 may control the display unit 251 to provide information on the measured air pressure at a current position. When the hiking item is selected and the third hard key 374 is pressed, the control unit 180 may control the display unit 251 to provide information on the altitude of the current position. When the hiking item is selected and the fourth hard key 375 is pressed, the control unit 180 may control the display unit 251 to display a compass. When the hiking item is selected and the fifth hard key 376 is pressed, the control unit 180 may control the display unit 251 to display information on the sunset time and the sunrise time at the current position.

According to the embodiment of the present invention, the function of the hard keys provided on the fourth-type bezel 370 may be varied depending on the selected sports item among sports items displayed on a sports item screen 603 illustrated in FIG. 19B. In other words, when a running item is selected, the plurality of hard keys may have functions of providing information on the speed, the running distance, the consumed calories, and the lap time. For another example, when a cycle item is selected, the hard keys may have functions of providing information on a speed, a mileage, an average speed, and a map. The function of each hard key may be varied depending on the setting of the user.

The present invention as described earlier may be implemented as a computer readable code in a medium having a program thereon. The computer readable medium includes all kinds of storage devices storing data that may be read by a computer system. Examples of a computer readable medium are a hard disk drive (HDD), a solid state disk (SSD), a silicon disk drive (SDD), a ROM, a RAM, a CD-ROM, a magnetic tape, a floppy disk, and an optical data storage device, and it is also implemented in the form of a carrier wave (e.g., data transmission through the Internet). Also, the computer may also include a control unit 180 of a terminal. Thus, the detailed description should not be construed as limitative in all aspects and should be considered exemplary. The scope of the prevent invention should be defined by the reasonable understanding of the following claims and all changes falling within the equivalent scope of the prevent invention are included in the scope of the prevent invention.

The invention claimed is:

1. An operating method for a wearable mobile terminal comprising a main body including a display unit and a band coupled to the main body, the operating method comprising:
    recognizing a bezel detachable from the display unit as at least a first bezel, a second bezel, or a third bezel based on at least one of a number of hard keys included in the bezel, positions of the hard keys on the bezel, a material of the bezel, or a color of the bezel;
    performing a first function in response to a first input received via at least one hard key of the recognized first bezel; and
    performing a second function in response to a second input received via at least one hard key of the recognized second bezel,
    wherein the recognized third bezel includes three hard keys, and the method further comprises:
    displaying a menu screen in response to a third input received via a first hard key of the third bezel;
    displaying a home screen in response to a fourth input received via a second hard key of the third bezel; and
    displaying a previous screen in response to a fifth input received via a third hard key of the third bezel.

2. The operating method of claim 1, wherein:
    the first bezel includes one hard key; and
    the first function comprises turning on or off power of the mobile terminal, displaying the home screen or the menu screen, or displaying a setting screen.

3. The operating method of claim 1, wherein:
    the second bezel includes two hard keys;
    a first hard key of the second bezel is used for entrance into an editing mode in which a chronograph displayed on the display unit is able to be edited; and
    a second hard key of the second bezel is used for access to applications installed in the mobile terminal.

4. The operating method of claim 1, wherein, when the bezel is recognized as a fourth bezel including five hard keys, one of the five hard keys is used to display a plurality of sports items, and remaining four keys among the five hard keys are used to provide information related to a sports item selected from among the plurality of sports items.

5. A wearable mobile terminal comprising:
    a main body including a display unit;
    a band coupled to the main body;
    a bezel detachable from the display unit; and
    a control unit configured to:
        recognize the bezel attached to the display unit as at least a first bezel, a second bezel, or a third bezel based on at least one of a number of hard keys included in the bezel, positions of the hard keys on the bezel, a material of the bezel, or a color of the bezel;
        perform a first function in response to a first input received via at least one hard key of the recognized first bezel; and
        perform a second function in response to a second input received via at least one hard key of the recognized second bezel;
    wherein the recognized third bezel includes three hard keys, and the control unit is further configured to cause the display unit to:
    display a menu screen in response to a third input received via a first hard key of the third bezel;
    display a home screen in response to a fourth input received via a second hard key of the third bezel; and
    display a previous screen in response to a fifth input received via a third hard key of the third bezel.

6. The mobile terminal of claim 5, wherein:
    the first bezel includes one hard key; and
    the control unit turns on or off power of the mobile terminal, displays the home screen or the menu screen, or displays a setting screen when the first function is performed.

7. The mobile terminal of claim 5, wherein:
    the second bezel includes two hard keys;
    a first hard key of the second bezel is used for entrance into an editing mode in which a chronograph displayed on the display unit is able to be edited; and
    a second hard key of the second bezel is used for access to applications installed in the mobile terminal.

8. The mobile terminal of claim 5, wherein, when the bezel is a fourth bezel including five hard keys, one of the five hard keys is used to display a plurality of sports items, and remaining four keys among the five hard keys are used to provide information related to a sports item selected from among the plurality of sports items.

9. The mobile terminal of claim 5, further comprising a sensing unit to acquire information on the bezel attached to the display unit,
    wherein the control unit recognizes the type of the bezel by using one of an electrical capacitance and a metal code of the attached bezel, which are sensed through the sensing unit.

* * * * *